US008493638B2

(12) United States Patent
Lee

(10) Patent No.: US 8,493,638 B2
(45) Date of Patent: Jul. 23, 2013

(54) SCANNER AND IMAGE FORMING APPARATUS HAVING THE SAME

(75) Inventor: Dong-Gyoo Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 834 days.

(21) Appl. No.: 12/684,458

(22) Filed: Jan. 8, 2010

(65) Prior Publication Data

US 2010/0171997 A1 Jul. 8, 2010

(30) Foreign Application Priority Data

Jan. 8, 2009 (KR) ........................ 10-2009-0001569

(51) Int. Cl.
*H04N 1/04* (2006.01)
(52) U.S. Cl.
USPC ........... 358/497; 358/486; 358/474; 358/482; 358/483; 358/494
(58) Field of Classification Search
None
See application file for complete search history.

(56) References Cited

U.S. PATENT DOCUMENTS

| 5,926,289 | A * | 7/1999 | Brandestini et al. | 358/487 |
| 6,301,061 | B1* | 10/2001 | Lin | 359/726 |
| 6,512,602 | B1* | 1/2003 | Sheng et al. | 358/498 |
| 7,055,743 | B2* | 6/2006 | Youngers | 235/454 |
| 7,170,649 | B2* | 1/2007 | Chang | 358/474 |
| 7,251,062 | B2* | 7/2007 | Harris et al. | 358/497 |
| 7,352,498 | B2* | 4/2008 | Harris | 358/497 |
| 7,486,423 | B2* | 2/2009 | Chang et al. | 358/497 |
| 7,495,843 | B2* | 2/2009 | Ge et al. | 359/699 |
| 2013/0044298 | A1* | 2/2013 | Jung et al. | 353/101 |

FOREIGN PATENT DOCUMENTS

JP 05-153344 6/1993

OTHER PUBLICATIONS

English languag abstract of JP 05-153344, published Jun. 18, 1993.

* cited by examiner

*Primary Examiner* — Cheukfan Lee
(74) *Attorney, Agent, or Firm* — Staas & Halsey LLP

(57) ABSTRACT

Disclosed are a scanner capable of adjusting the focus distance and an image forming apparatus having the same. The scanner may include a focus adjustment structure that comes into an interfering contact with a scanning unit as the scanning unit moves along a scanning path so as to cause a movement of the scanning unit in the direction perpendicular to the scanning path toward and away from the document to be scanned. With such configuration the focus adjustment can be realized using the scanning movement of the scanning unit along the scanning path.

20 Claims, 10 Drawing Sheets

SCANNER AND IMAGE FORMING APPARATUS HAVING THE SAME

CROSS-REFERENCE TO RELATED APPLICATION

This application claims priority from Korean Patent Application No. 10-2009-0001569, filed on Jan. 8, 2009 in the Korean Intellectual Property Office, the disclosure of which is incorporated herein by reference in its entirety.

TECHNICAL FIELD

The present disclosure relate generally to a scanner and an image forming apparatus having the same, and, more particularly, to a scanner having an adjustable focus and an image forming apparatus having the same.

BACKGROUND OF RELATED ART

A scanner is a device that is used to scan or read an image of a document, and are available as a standalone scanner or may be operationally incorporated into the image processing devices such as, for example, an electronic copier, facsimile or a multifunction apparatus that combines some of the functionalities of the afore-mentioned and other devices.

In order to read an images of a document, a scanner includes a scan sensor, i.e., an image sensor. When the focusing distance from the scan sensor to the document is fixed, the quality of the scanned image of the document may be compromised if the position of the document in relation to the scan sensor deviates from a predetermined range.

Moreover, the scanner may be required to perform at least an automatic type scanning, in which the scan sensor is stationary to scan a document being transported, e.g., by an automatic document feeder, past the scan sensor, and a manual type scanning, in which a document is manually placed on a platen and is scanned by the scan sensor moving across the document.

In some cases, the respective proper focus distance may not be the same for the automatic scanning and for the manual scanning for the possible reasons of the difference in the thickness of the platen and/or other design considerations. In order to scan a document at different focus distances to obtain a satisfactory scan quality using a single scan sensor, it may thus be desirable to be able to move the scan sensor in a focus direction, such as closer to or further from the document. It may also be desirable to accomplish such focusing movement of the scan sensor without significantly adding to the complexity and/or cost of the scanner.

SUMMARY OF THE INVENTION

According to one aspect of the present disclosure, a scanner may be provided to comprise a scanning unit, a rack and a focus adjusting unit. The scanning unit may be configured to receive an optical information from a document while moving across the document along a scanning direction. The rack may be disposed within the main body of the scanner at a location along a path of movement of the scanning unit along the scanning direction. The focus adjusting unit may be coupled to the scanning unit, and may be configured to come into an engaging contact with the rack to thereby cause a movement of the scanning unit along a focus direction perpendicular to the scanning direction.

The focus adjusting unit may comprise a gear configured to rotate in engagement with the rack. The rotational movement of the gear may cause the movement of the scanning unit along the focus direction.

The focus adjusting unit may comprise a unit teeth row disposed at the scanning unit and arranged to engage the gear.

The scanning unit may comprise a scanning module and a support frame. The scanning module may have an optical sensor configured to receive the optical information and to convert the received optical information into an electrical signal. The support frame may support the scanning module. The unit teeth row may be formed on the support frame.

The support frame may comprise a boss received into an opening formed on a central portion of the gear. The unit teeth row may be formed on an outer periphery of the boss. The gear may comprise a first teeth row formed on an outer surface of the gear and a second teeth row formed in the opening of the gear. The first teeth row may be arranged to engage the rack. The second teeth row may be arranged to engage the unit teeth row of the boss.

The scanner may further comprise a guiding frame supporting thereon the support frame. The guiding frame may have a stud rotatably supporting the gear, and may be configured to receive a driving force and to move in the scanning direction according to the received driving force.

The scanner may further comprise an elastic member arranged to elastically bias the support frame in the focus direction.

The gear may comprise a first gear arranged to engage the rack and a second gear arranged to rotate coaxially with the first gear and to engage the unit teeth row.

The focus adjusting unit may be disposed at both ends of the scanning unit.

The scanner may further comprise a platen and an automatic document transport unit. The platen may define a planar surface on which the document is to be positioned to be scanned. The automatic document transport unit may be configured to receive one or more documents and to transport the received one or more documents to the platen. The platen may comprise an automatic scanning area and a manual scanning area. The scanning unit may be positioned adjacent to the automatic scanning area when receiving the optical information from the document that was transported by the automatic document transport unit. The scanning unit may be positioned adjacent to the manual scanning area when receiving the optical information from the document that was manually placed on the platen.

The rack may be disposed adjacent to an intermediate area of the platen between the automatic scanning area and the manual scanning area.

The rack may comprise a first rack and a second rack spaced apart from each other. Each of the first and second racks may be disposed along a portion of the path of movement of the scanning unit in which portion the scanning unit is operable to receive the optical information from the document.

Each of the first rack and the second rack may be configured to cause the movement of the scanning unit along the focus direction when engaged with the focus adjusting unit.

The scanner may further comprise a rack moving unit configured to move at least one of the first rack and the second rack selectively between an engaging position and a releasing position. The at least one of the first rack and the second rack may be able to engage with the focus adjusting unit when the at least one of the first rack and the second rack is in the engaging position. The at least one of the first rack and the second rack may be incapable of engaging with the focus adjusting unit when the at least one of the first rack and the second rack is in the releasing position.

The scanner may be operable in a user selectable book scanning mode. The scanner may further comprise a control unit configured to control the rack moving unit so that the first rack and the second rack are both in the engaging position in response to the book scanning mode being selected by the user.

According to another aspect of the present disclosure, an image forming apparatus may be provided to comprise a scanner and a printing unit. The printing unit may be configured to form a visible image on a printing medium based on an image data obtained through the scanner. The scanner may comprise a scanner body, a scanning unit, a rack and a focus adjusting unit. The scanning unit may be configured to receive an optical information from a document while moving across the document along a scanning direction. The rack may be disposed within the scanner body at a location along a path of movement of the scanning unit along the scanning direction. The focus adjusting unit may be coupled to the scanning unit, and may be configured to come into an engaging contact with the rack to thereby cause a movement of the scanning unit along a focus direction perpendicular to the scanning direction.

According to yet another aspect of the present disclosure, a scanner for acquiring an image of a document may be provided to comprise an image sensor, an image sensor carrier and an interfering member. The image sensor may be configured to receive optical information from the document and to convert the received optical information into electrical signals. The image sensor carrier may support thereon the image sensor, and may be configured to move in a first direction and in a second direction opposite the first direction. The interfering member may be positioned to come into an interfering contact with a portion of the image sensor carrier in such a manner the interfering contact causes the image sensor carrier to move perpendicular to the first and second directions. The image sensor carrier may move in a third direction toward the document when the image sensor carrier comes into the interfering contact with the interfering member while moving in the first direction. The image sensor carrier may move in a fourth direction away from the document when the image sensor carrier comes into the interfering contact with the interfering member while moving in the second direction.

The interfering member may comprise a rack gear disposed along a path of movement of the image sensor carrier along the first and second directions. The image sensor carrier may comprise a rotational gear and a geared extension portion. The rotational gear may be capable of engaging with the rack gear, and may have an opening through which the geared extension portion is received. The rotational gear may have gear teeth formed in the opening for engagement with the geared extension portion such that a rotational movement of the rotational gear causes the geared extension portion to move linearly in the opening to thereby cause a linear movement of the image sensor carrier along the third and fourth directions.

The scanner may be operable in a scanning mode in which the image sensor carrier moves in the third direction and subsequently in the fourth direction during scanning of a single document.

The scanner may further comprise a platen that may define a substantially planar surface on which the document rests while being scanned. The scanner may be operable in at least a first scanning mode and a second scanning mode. The image sensor may be space apart from the platen by a first distance when the scanner is operating in the first scanning mode. The image sensor may be space apart from the platen by a second distance different from the first distance when the scanner is operating in the second scanning mode.

BRIEF DESCRIPTION OF THE DRAWINGS

Various aspects of the disclosure will become apparent and more readily appreciated from the following description of the embodiments, taken in conjunction with the accompanying drawings, in which.

DETAILED DESCRIPTION OF EXEMPLARY EMBODIMENTS

Figure 1:
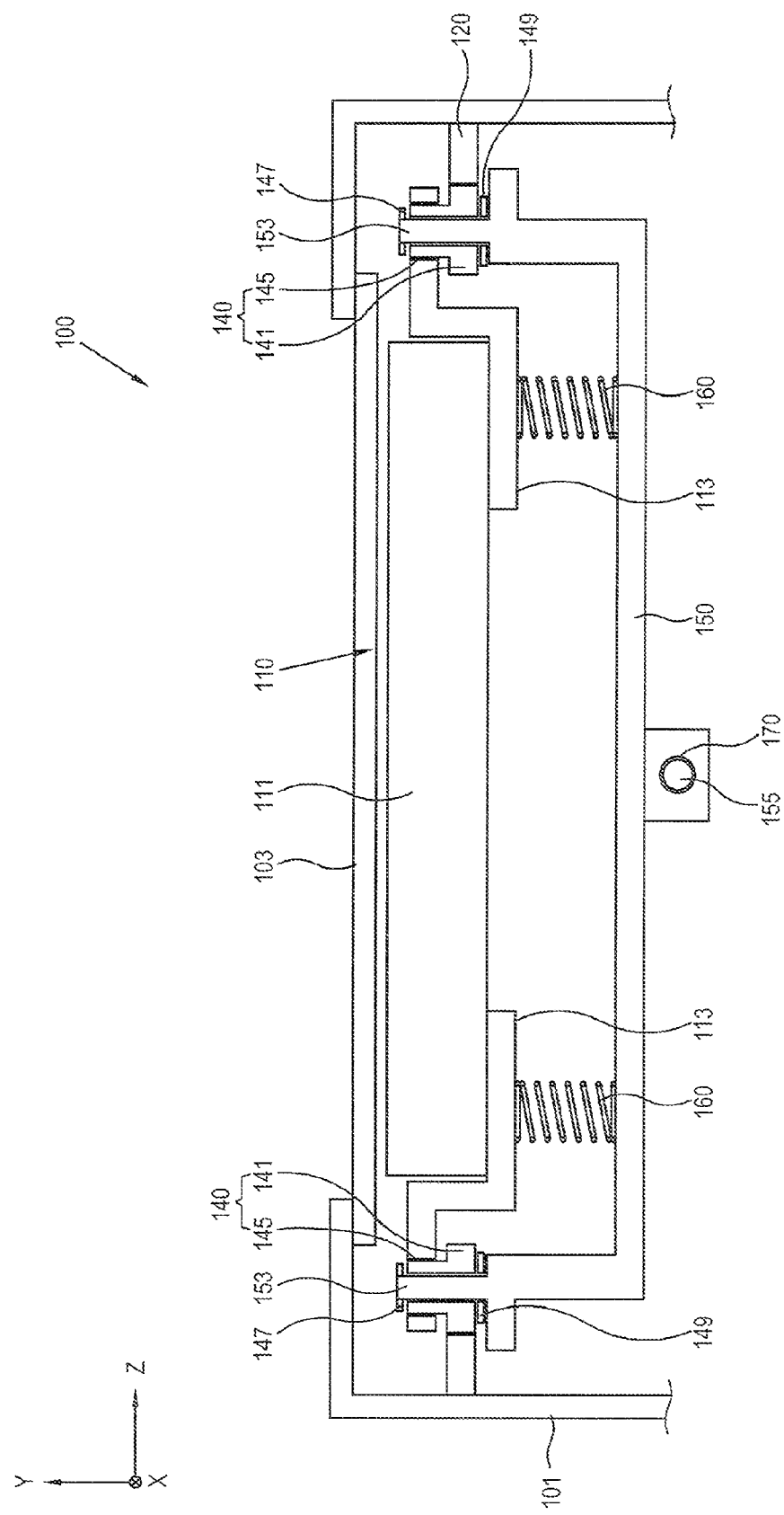
FIG. 1 is a schematic cross-sectional view of a scanner according to an embodiment of the present disclosure.

Reference will now be made in detail to several embodiments, examples of which are illustrated in the accompanying drawings, wherein like reference numerals refer to like elements throughout, repetitive descriptions of which may be omitted. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 2:
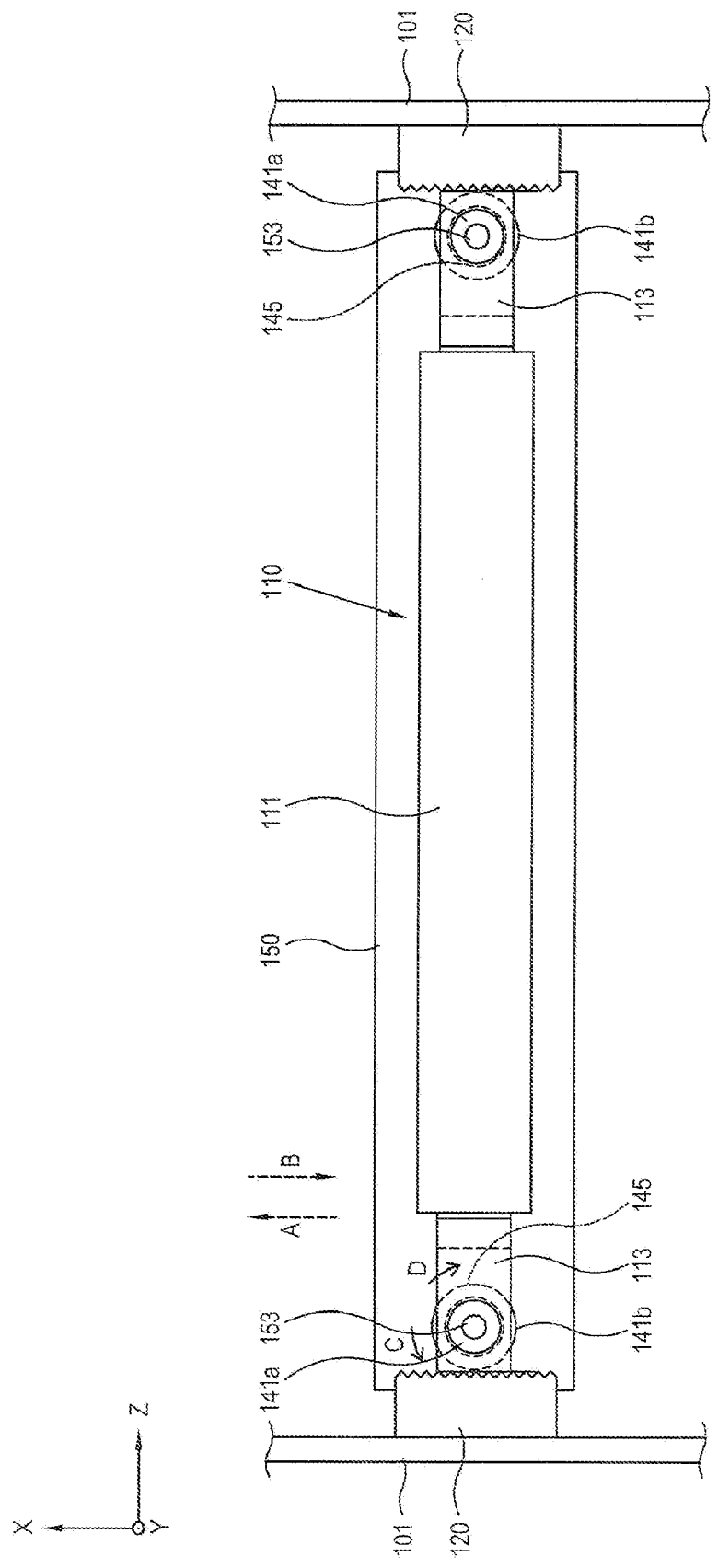
FIG. 2 is a schematic plane view of the scanner depicted in FIG. 1.

As shown in FIGS. 1 and 2, a scanner 100 according to an embodiment of the present disclosure may include a main body 101, a scanning unit 110 moving in a scanning direction X to scan an image of a document, a rack 120 supported on the main body 101 to extend in the scanning direction X and a focus adjusting unit 140 coupled with the rack 120 and configured to move the scanning unit 110 in a focus direction Y perpendicular to the scanning direction X.

Figure 3:
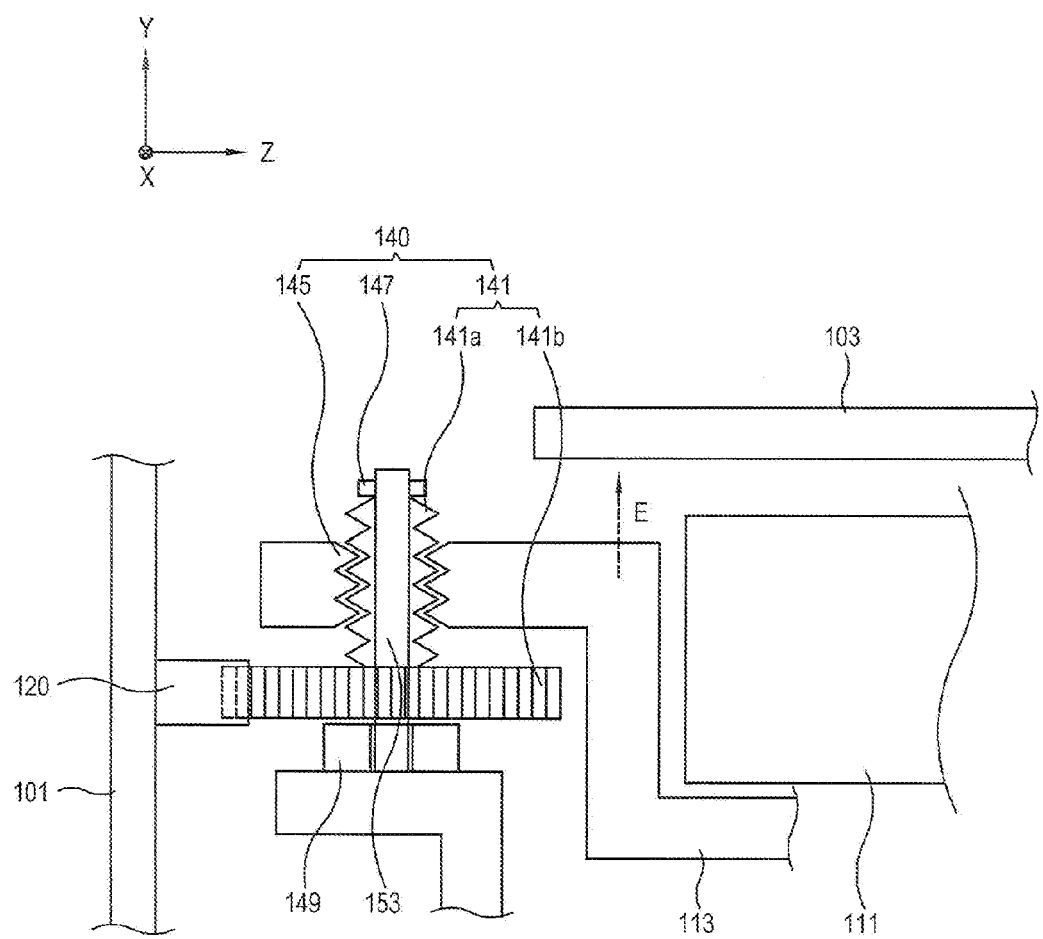
FIG. 3 is an enlarged view of relevant portions of the scanner depicted in FIG. 1.

As shown in FIGS. 1 to 3, the focus adjusting unit 140 may include a gear 141 engaged with the rack 120 to move the scanning unit 110 in the focus direction Y.

Referring to FIG. 2, if the gear 141 and the rack 120 are engaged with each other while the scanning unit moves in a forward direction A of the scanning direction X, the gear 141 rotates in a clockwise direction C. On the other hand, if the gear 141 and the rack 120 are engaged with each other while the scanning unit moves in a reverse direction B along the scanning direction X, the gear 141 rotates in a counterclockwise direction D.

As shown in FIG. 3, the gear 141 may include a first gear 141b engaged to the rack 120 and a second gear 141a arranged to rotate coaxially together with the first gear 141b and to be engaged with a unit teeth row 145.

In some embodiments, the first gear 141b and the second gear 141a may be formed integrally with respect to each other. The respective radiuses of the first gear 141b and the second gear 141a may be different from each other or the same.

The scanner 100 may further include a ring 147 disposed on the upper side of the gear 141 and a washer 149 disposed on the lower side of the gear 141 to limit the movement of the gear 141 in the focus direction Y.

According to an embodiment, a groove (not shown) may be provided around the circumference of a stud 153 of a portion thereof, into which recess the ring 147 may be received.

As also shown in FIG. 3, the focus adjusting unit 140 may further include the unit teeth row 145 formed on a portion of the scanning unit 110 to be engaged to the gear 141.

The unit teeth row 145 moves the scanning unit 110 in a forward direction E of the focus direction Y when the gear 141 rotates in the clockwise direction C in engagement with the rack 120. That is, as the gear 141 rotates in the clockwise direction C, the unit teeth row 145 moves the scanning unit 110 toward a platen 103, on which a document to be scanned may be placed. Alternatively, the unit teeth row 145 may be arranged to move the scanning unit 110 in a reverse direction (i.e., opposite to the direction E) of the focus direction Y when the gear 141 rotates in the clockwise direction C, and to move the scanning unit 110 in the forward direction E when the gear 141 rotates in the counterclockwise direction D.

In the present illustrative example, the unit teeth row 145 may move the scanning unit 110 in the reverse direction of the focus direction Y when the gear 141 rotates in the counterclockwise direction D.

Accordingly, as the scanning unit 110 moves in the forward direction A and in the reverse direction B along the scanning axis X to pass through a position in which the rack 120 is disposed, the position of the scanning unit 110 in the focus direction Y can be adjusted.

The scanner 100 may further include a scanning unit moving unit (not shown) reciprocating the scanning unit 110 along the scanning axis X.

Referring to FIG. 1, the scanning unit moving unit may includes a guiding shaft 170 arranged parallel to the scanning axis X so as to be capable of guiding the movement of the scanning unit 110 along the scanning direction and a driving force source (not shown) supplying a driving force to the scanning unit 110 to move along the guiding shaft 170.

The driving force source may include, for example, a driving motor (not shown) and/or a pulley and belt arrangement that includes a driving pulley (not shown) connected to a driving shaft of the driving motor, a driven pulley (not shown) arranged to be spaced apart from the driving pulley in the scanning direction X, a belt (not shown) rotating around a loop while being supported by the driving pulley and the driven pulley, and a clamper (not shown) clamping the belt and the scanning unit 110 so that the scanning unit 110 moves together with the belt.

The driving force sources of the above configurations are described only as non-limiting examples. Various changes or modifications can be made to the above described configurations or alternative configurations can be employed in some embodiments to the extent such driving force sources can drive the scanning unit 110 to move in the scanning direction X.

According to an aspect of the present disclosure, the scanner 100 according to an embodiment may be capable of moving the scanning unit 110 in the focus direction Y without a separate dedicated driving force source, thereby advantageously realizing a reduction in the manufacturing cost of the scanner 100.

The scanning unit 110 may include a scanning module 111. The scanning module 111 may includes a light source (not shown) producing a light that may be directed toward the platen 103 on which a document may be placed, an optical assembly (not shown) configured to receive the light reflected by the document and an image sensor (not shown) configured to convert the received reflected light into an electrical signal.

The image sensor may include, for example, a charge coupled device (CCD) sensor, a complementary metal oxide semiconductor (CMOS) sensor, and/or the like.

The scanning unit 110 may further include a support frame 113 supporting the scanning module 111 and having formed thereon the unit teeth row 145.

The scanner 100 may further include a guiding frame 150. The guiding frame 150 may include the stud 153 rotatably supporting thereon the gear 141 and an insert hole 155 into which the guiding shaft 170 may be received. The guiding frame 150 may support the support frame 113. For example, the scanner 100 may further include one or more elastic members 160 elastically biasing the support frame 113 in the forward direction E of the focus direction Y. The elastic members 160 may be unnecessary in some embodiments depending on the particular intended application and/or design, and may thus be omitted.

While in the figures, the focus adjusting unit 140 and the rack 120 are depicted as being disposed on both of the opposite sides of the scanning unit 110 as illustrative example, other arrangements are also possible. For example, the focus adjusting unit/rack pairing can be provided on only one side of the scanning unit 110 or at a central portion (i.e., at a position of the guiding shaft 170) in addition to, or in lieu of, provision of the pairings at the sides of the scanning unit 110.

Figure 4A:
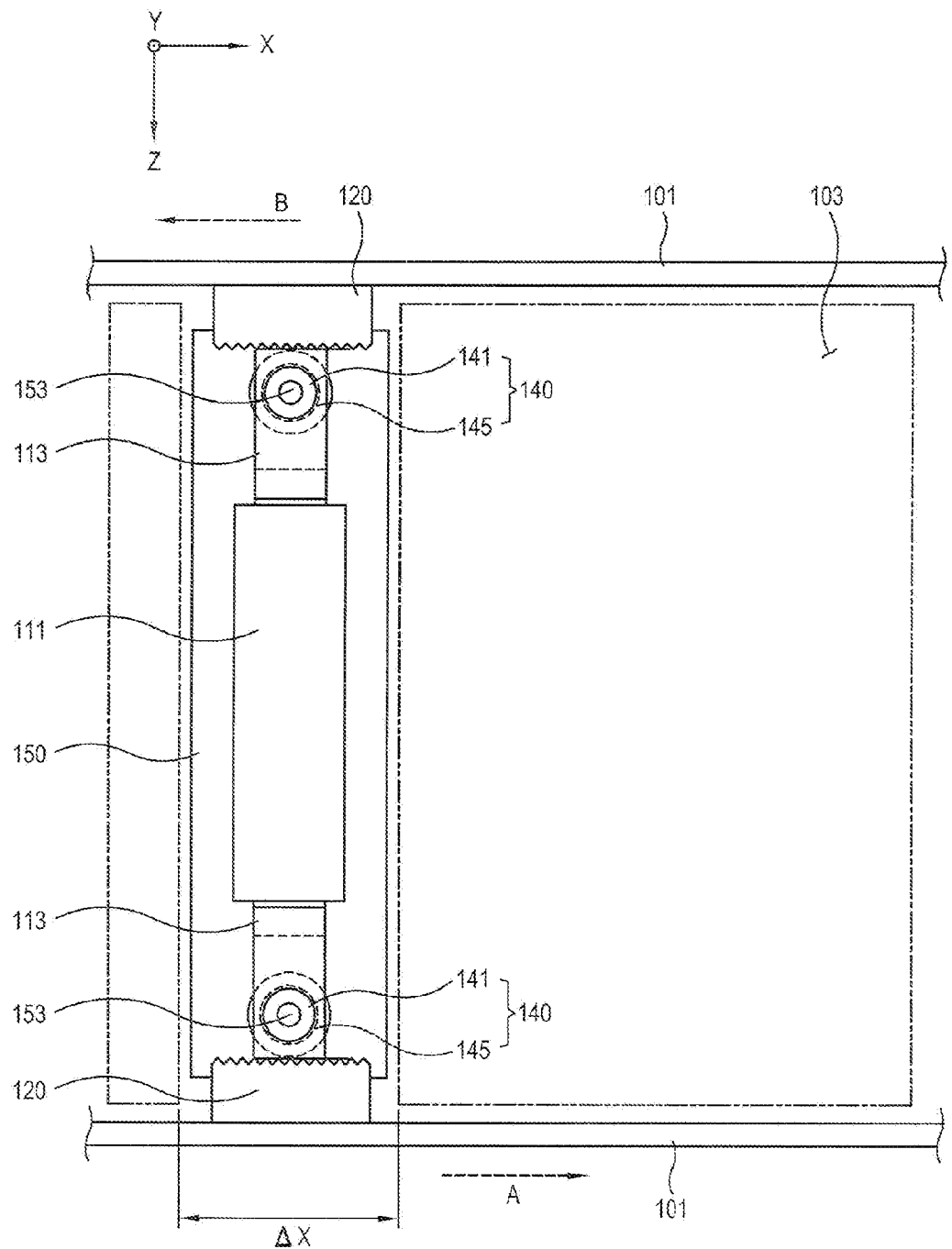
FIGS. 4A and 4B illustrate the movement of a focus direction according to an embodiment of the present disclosure.
Figure 4B:
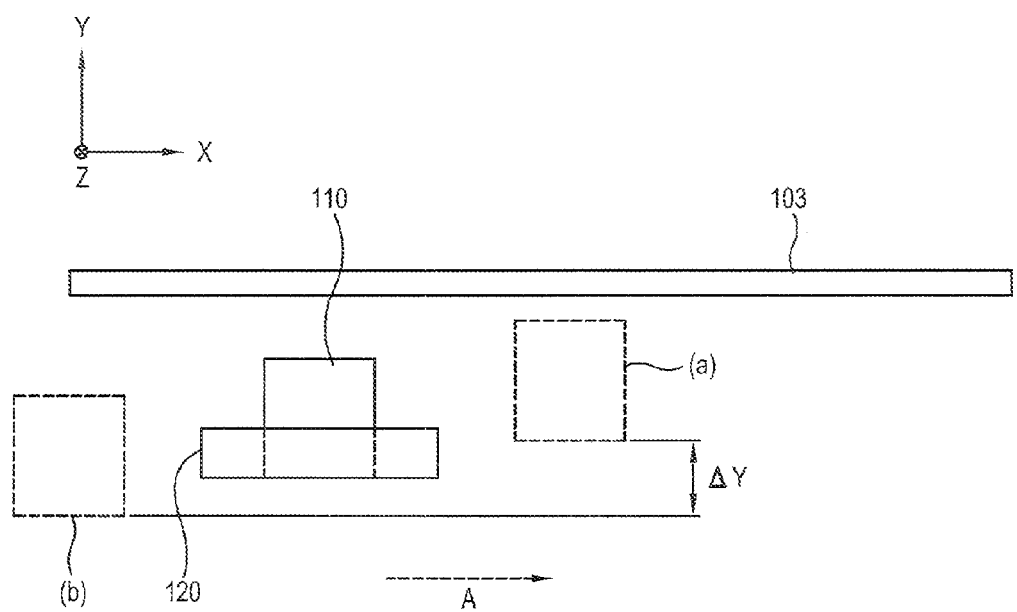

Referring now to FIGS. 4A and 4B, an operation of the scanner 100 according to an embodiment will be described. FIG. 4A is a plane view illustrative of relevant portions of the scanner 100. FIG. 4B is a schematic side view of the portions of the scanner depicted in FIG. 4A, in which, for the sake of brevity, the scanning unit 110 is depicted as a tetragonal box.

Referring to FIGS. 4A and 4B, when the scanning unit 110 positioned at the left scanning area (b), which is to the left of the section ΔX in which the rack 120 is disposed, moves in the forward direction A along the scanning axis X into the section ΔX, the gear 141 rotates in the clockwise direction in engagement with the rack 120 causing the scanning unit 110 to move upwardly along the focus axis Y by a focus direction moving distance ΔY.

On the other hand, when the scanning unit moves from the right scanning area (a) in the reverse direction B along the scanning axis X past the section ΔX, the gear 141 rotates in the counterclockwise direction in engagement with the rack 120 so as to cause the scanning unit 110 to move downwardly along the focus axis Y by the focus direction moving distance ΔY. Accordingly, the focusing distance of the scanning unit 110 can return to the original distance when the scanning unit 110 returns to the left scanning area (b).

According to several embodiments of the present disclosure, the focus direction moving distance ΔY may be made to vary, and may depend on the length of the rack 120 along the scanning axis X, the number of rotation of the gear 141, the pitch of the first gear 141a, and/or the pitch of the unit teeth row 145. A suitable focus direction moving distance ΔY may be obtained by an appropriate design taking into consideration the above factors.

Figure 5:
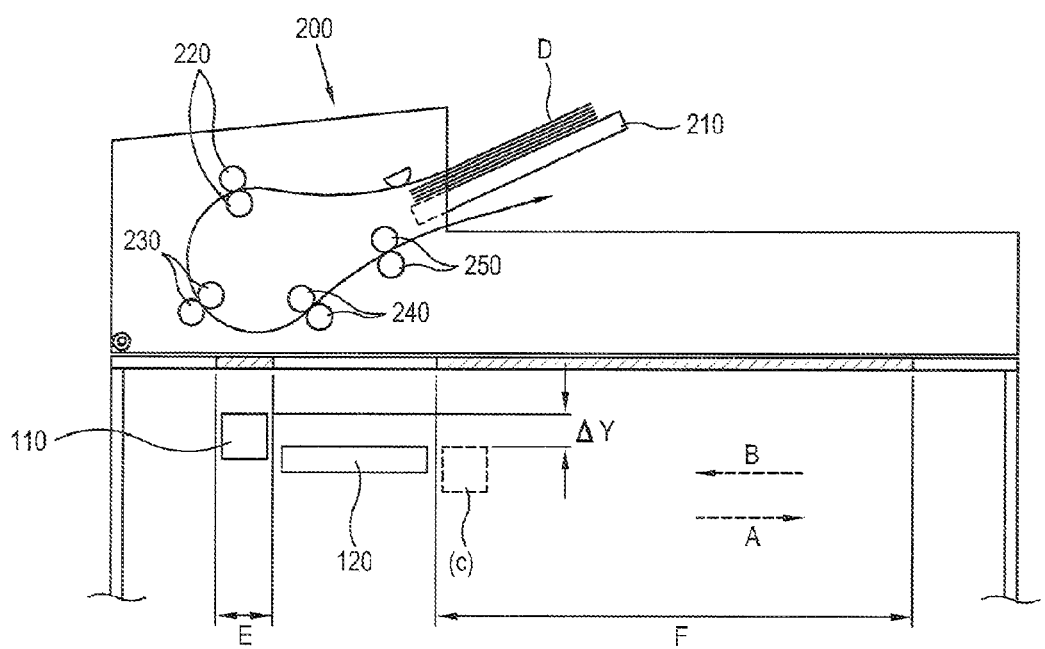
FIG. 5 is a schematic of a scanner according to another embodiment of the present disclosure.

FIG. 5 illustrates an embodiment of a scanner 100 according to an embodiment.

The scanner 100 according to an embodiment may further include an automatic document transporting unit 200 that may automatically transport one or more documents D to the scanning unit 110. The platen 103 may include an automatic scanning area E scanning a document transported by the automatic document transporting unit 200 and a manual scanning area F scanning a document manually placed.

The automatic document transporting unit 200 may includes a loading support 210 on which document(s) D to be scanned may be loaded and a plurality of roller pairs 220, 230, 240 and 250 configured to transport the loaded document(s) D across the automatic scanning area E.

In an automatic scanning mode, the scanning of a document is automatically performed by using the automatic scanning area E. More particularly, upon a scanning command from a user, it is determined whether there is a document loaded on the loading support 210. This may be achieved by providing a document sensor at the loading support 210. If a document is sensed as being loaded on the loading support 210, the automatic scanning mode may be performed, in which mode, the scanning unit 110 may be positioned in the automatic scanning area E, and may scan the document D transported by the automatic document transporting unit 220.

On the other hand, in a manual scanning mode, the scanning is performed in the manual scanning area F. More particularly, if it is determined that there is no document on the loading support 210, the manual scanning mode may be performed, in which mode, the scanning unit 110 scans an image of a document placed on the manual scanning area F of the platen 103 while the scanning unit 110 moves in the forward direction A along the scanning axis X.

According to an embodiment, the rack 120 may be disposed between the automatic scanning area E and the manual scanning area F.

If the focus distance needed in the automatic scanning area E and the focus distance needed in the manual scanning area F are different, the focus distance of the scanning unit 110 can be adjusted by disposing the rack 120 as shown in FIG. 5. That is, when switching the scanning mode from the automatic scanning mode to the manual scanning mode, the scanning unit 110 may be made to move downward along the focus axis Y by the predetermined focus distance moving distance $\Delta Y$ when the scanning unit 110 moves past through the rack 120. The manual scanning may then be performed while the scanning unit 110 in such downwardly moved position to thereby obtain an improved scanning quality.

On the other hand, when switching the scanning mode from the manual scanning mode to the automatic scanning mode, the scanning unit 110 may be made to move upwardly along the focus axis X by the predetermined focus distance moving distance $\Delta Y$ as the scanning unit 110 is made to move past through the rack 120. The automatic scanning may then be performed with the scanning unit 110 positioned in such upwardly moved position to maintain an appropriate focus distance and to thereby obtain an improved scanning quality.

Figure 6A:
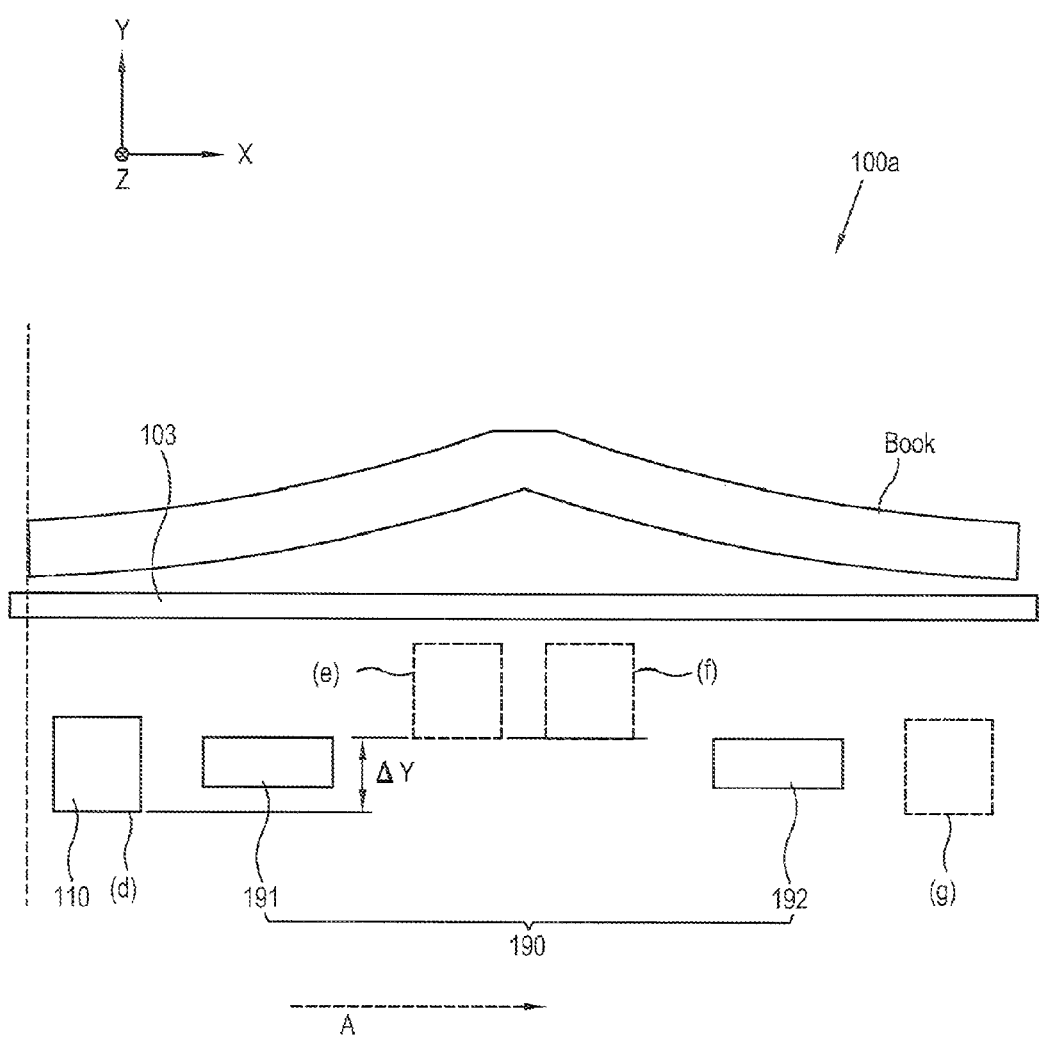
FIGS. 6A and 6B are respectively a schematic cross-sectional view and a schematic plane view of a scanner according to another embodiment of the present disclosure.
Figure 6B:
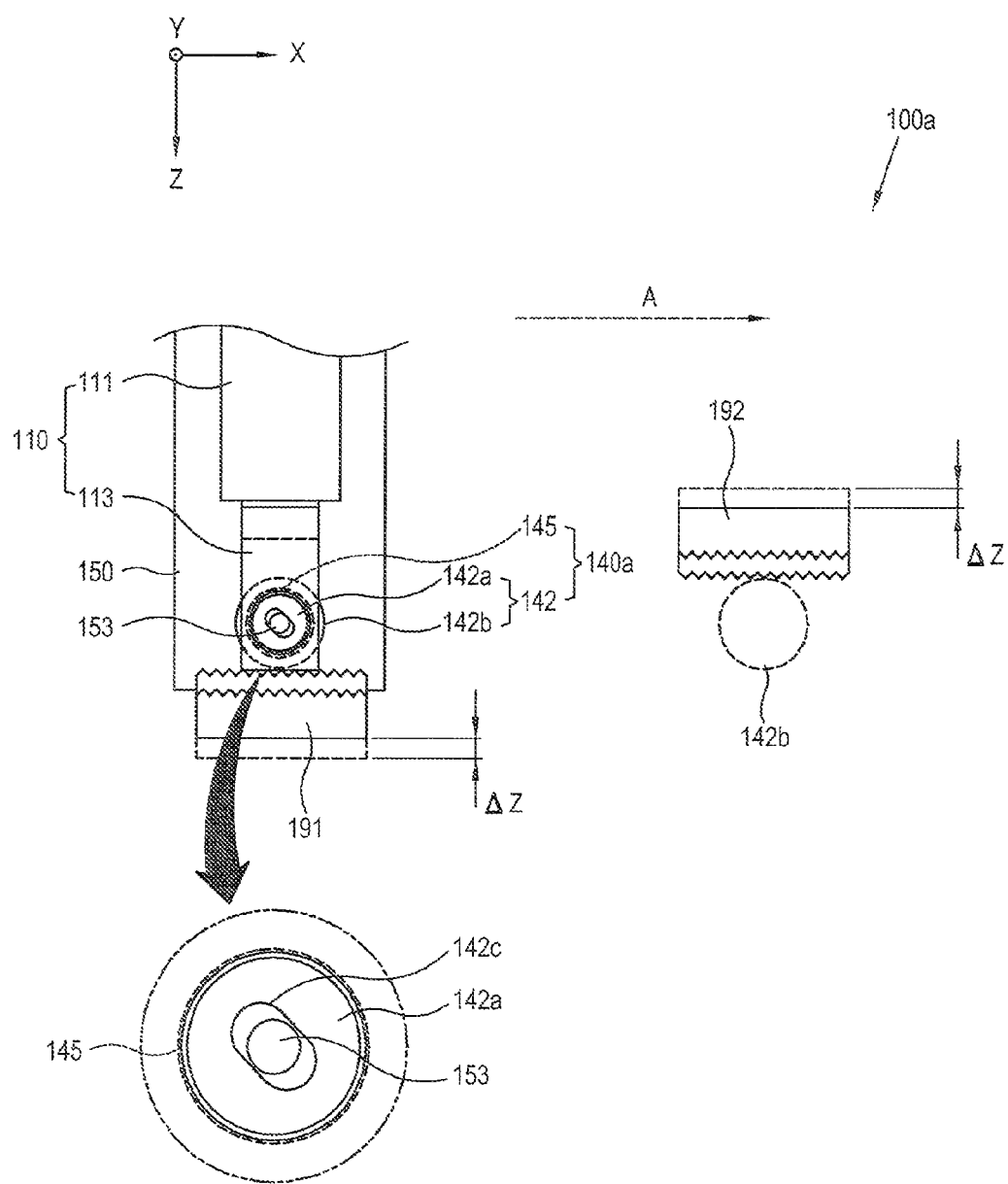

Referring now to FIGS. 6A and 6B, a scanner 100a according to another embodiment of the present disclosure may include a scanning unit 110, a plurality of racks 190 disposed along the scanning direction X and a focus adjusting unit 140a coupled with the plurality of racks 190 to move back and fourth the scanning unit 110 along the focus direction Y perpendicular to the scanning direction X.

The plurality of racks 190 may include a first rack 191 and a second rack 192 spaced apart from each other along the scanning direction X.

According to an embodiment, the first rack 191 and the second rack 192 may be disposed within the document scanning area in which the scanning of a document actually takes place. For example, in the embodiments previously described in reference to FIG. 5, the rack 120 may be disposed in an area where no document scanning is performed, i.e., between the two scanning areas, the automatic scanning area E and the manual scanning area F, in which areas the scanning actually takes place. According to an embodiment, as shown in FIG. 6A, one or both of the first rack 191 and the second rack 192 may be disposed inside the document scanning area in which the scanning actually takes place.

The focus adjusting unit 140a may be particularly advantageous in scanning a non-planar document surface, for example, an open book with a binding in the middle, which may not lay flat on the platen 103.

For example, as the scanning unit 110 moves in the forward direction A along the scanning axis X past through the first rack 191, the scanning unit 110 moves in the forward direction along the focus axis Y, i.e., upwardly as shown in FIG. 6A, by a focus direction moving distance $\Delta Y$. Accordingly, the image from the middle portion of the book that may be at a greater distance from the platen 103 can be scanned with an improved quality.

That is, as passing through the first rack 191, the scanning unit 110 moves from an initial position (d) to a first moving position (e) at which the scanning unit 110 has moved forward in the focus direction Y by the focus direction moving distance $\Delta Y$. Then, the scanning unit 110 may move further across to the position (f) maintaining the proper focus distance until the scanning unit 100 reaches and passes through the second rack 192. Then, the scanning unit 110 moves further passing through the second rack 192 to an end position (g) at which the scanning unit 110 has moved back in the focus direction Y by the focus direction moving distance $\Delta Y$.

According to an embodiment, the end position (g) and the initial position (d) may be the same position with respect to the focus direction Y. Accordingly, the movement of the scanning unit 110 as described above allows the scanning unit 100 to scan both the middle binding portion at a greater distance from the platen 103 and the end portions that lay flatter on the platen 103, of the book with an improved scan quality.

FIG. 6B is a schematic plane view of portions of the scanner 100a shown in FIG. 6A. The focus adjusting unit 140a of the scanner 100a may include a gear 142 arranged to be coupled with the plurality of racks 191 and 192 and to thus rotate to move the scanning unit 110 along the focus direction Y.

According to an embodiment, the gear 142 may have a central hole 142c, through which the stud 153 may be received, that may have an elongated opening. The elongated opening may advantageously act to buffer some of the shock that may be generated due to contact between the plurality of racks 191 and 192 and the gear 142 during scanning. The gear 142 may include a first gear 142b configured to engage with the racks 190 and a second gear 142a arranged to rotate coaxially together with the first gear 142b and to be engaged with the unit teeth row 145 provided on the support frame 113, in substantially similar manner as the first and second gears 141b and 141a of the gear 141 of the embodiments previously described in reference to FIGS. 1-5.

By way of an illustrative example, the gear 142 may be arranged to rotate in the clockwise direction in engagement with the first rack 191, and to rotate in the counterclockwise direction in engagement with the second rack 192. Thus, according to the example, as it moves in the scanning direction X, the scanning unit 110 can move back and forth along the focus axis Y by passing through the two racks 191 and 192.

Figure 7:
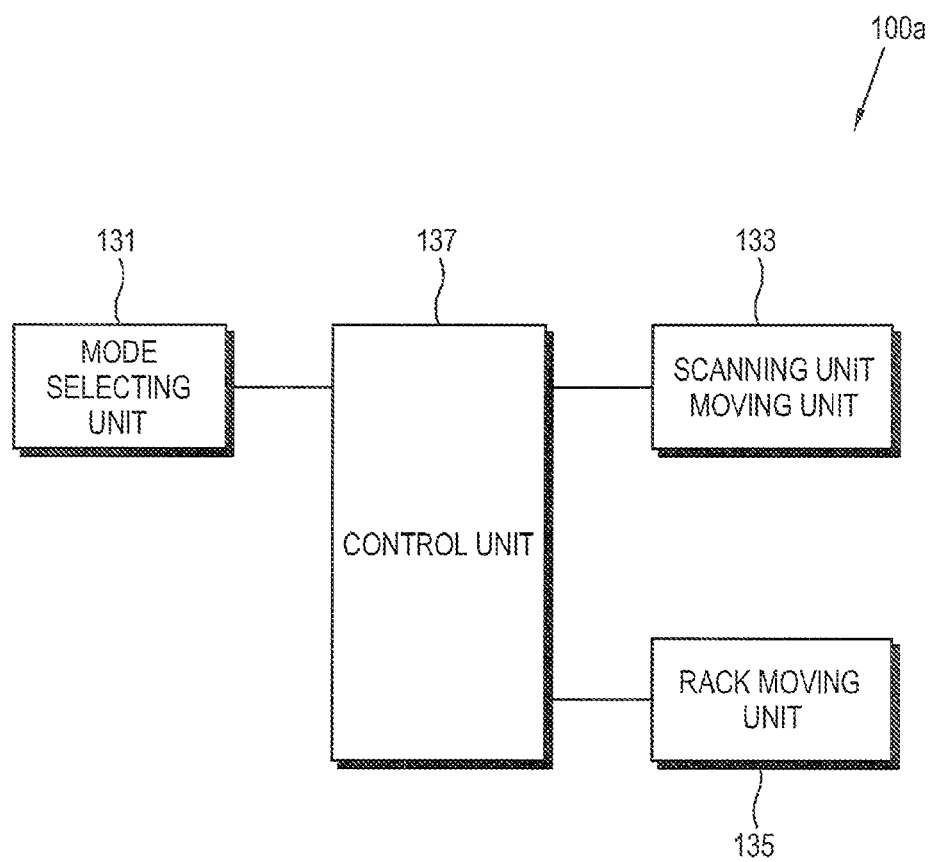
FIG. 7 is a block diagram of the scanner depicted in FIG. 6A.

As shown in FIG. 7, the scanner 100a according to an embodiment may further include a mode selecting unit 131, a scanning unit moving unit 133, a rack moving unit 135 and a control unit 137 configured to control the scanning unit moving unit 133 and the rack moving unit 135.

According to an embodiment, a user may be provided with an ability to specify or select a book scanning mode through the mode selecting unit 131. To that end, the mode selecting unit 131 may be any mechanism or device that allows the user to input the selection, and may include, for example, a simple button, a keypad, keyboard, mouse, trackball, a touch screen and the like devices. The scanning unit moving unit 133 may be configured to move the scanning unit 110 along the scanning direction X. While, for brevity sake, not specifically shown in FIG. 7, it would be understood by one skilled in the art that the scanning moving unit 133 may be any known mechanisms and configurations for causing the movement of the scanning unit in reciprocating manner, and that it may include, for example, the motor and/or belt and pulley arrangements described earlier herein. The rack moving unit 135 may be configured to move at least one of the racks 191 and 192 so that the focus adjusting unit 140a and at least one of the racks 191 and 192 can selectively engage with each other. The rack moving unit 7 may be of any known structure capable of causing the movement of the racks described herein, and may include, for example, without limitation, a solenoid mechanism, an elastic bias mechanism and magnetic mechanism, or the like.

While a detailed structure of the control unit 137 is not depicted in FIG. 7, as would be readily understood by those skilled in the art, the control unit 137 may include, e.g., a microprocessor, a microcontroller or the like, that includes a CPU to execute one or more computer instructions to implement the various control operations herein described and/or control operations relating to other components of the scanner, and to that end may further include a memory device, e.g., a Random Access Memory (RAM), Read-Only-Memory (ROM), a flesh memory, or the like, to store the one or more computer instructions.

As shown in FIG. 6B, the rack moving unit 135 may move one or more of the racks 191 and 192 in the main scanning direction Z by a predetermined distance ΔZ so that the gear 142 of the focus adjusting unit 140a can be selectively engaged with or released from the racks 191 and 192.

For example, one or both of the racks 191 and 192 may have at least an engaging position (indicated with a solid line in FIG. 6B), in which the one or both of the racks 191 and 192 may be capable of engaging with the gear 142 of the focus adjusting unit 140a, and a releasing position (indicated with a dotted line in FIG. 6B), in which the one or both of the racks 191 and 192 may be incapable of engaging with the gear 142 of the focus adjusting unit 140a. With the one or both of the racks 191 and 192 racks 190 in the engaging position, the scanning unit 110 can move along the focus direction Y so as to be able to adjust the focus distance. On the other hand, if the racks 191 and 192 are in the releasing position, the gear 142 of the focus adjusting unit 140a does not engage the racks 191 and 192, resulting in the scanning unit 110 moving along the scanning direction X while maintaining its position with respect to the focus direction Y.

According to an embodiment, if the book scanning mode is selected, the control unit 137 may control the rack moving unit 135 to move the racks 191 and 192 into the engaging position so that the focus adjusting unit 140a can engage with the racks 191 and 192. The control unit 137 may also control the scanning unit moving unit 133 to move the scanning unit 110 along the scanning direction X. With the racks 191 and/or 192 in the engaging position, a document, e.g., a book, that may not lay flat on the platen 103 may be scanned with an improved scan quality by taking into account the varying distance from the platen across the surface of the document.

When the book scanning mode is not selected, that is, if a general scanning mode is selected, the control unit 137 may control the rack moving unit 135 to move the plurality of racks 191 and 192 into the releasing position so that the focus adjusting unit 140a do not engage the racks 191 and 192. Then, when the control unit 137 controls the scanning unit moving unit 133 to move the scanning unit 110 along the scanning direction X, a general document laying substantially flat on the platen 103 can be satisfactorily scanned.

Figure 8:
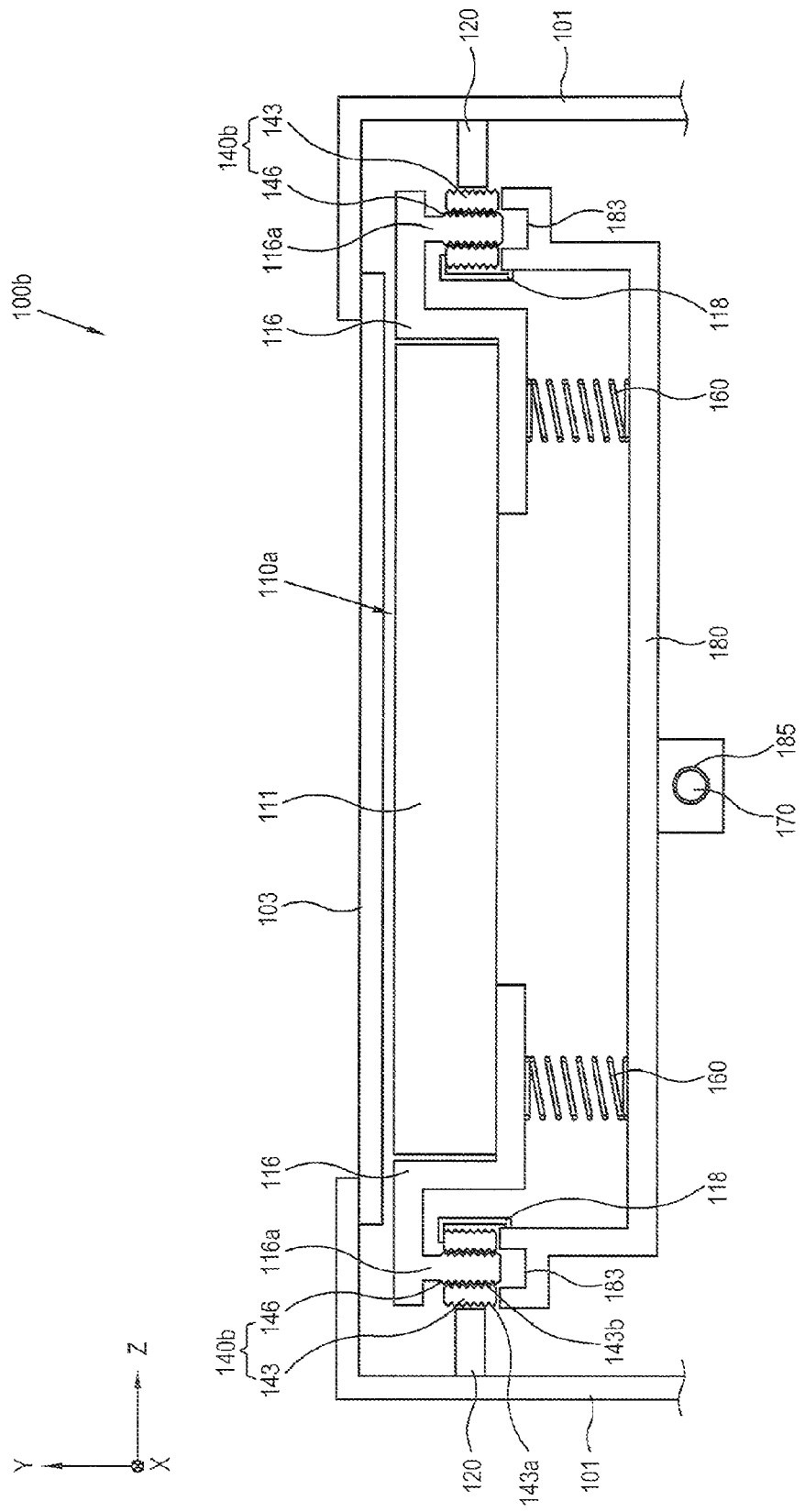
FIG. 8 is a schematic cross-sectional view of a scanner according to another embodiment of the present disclosure.

As shown in FIG. 8, a scanner 100b according another embodiment of the present disclosure may include a scanning unit 110a, a rack 120 disposed along the scanning direction X and a focus adjusting unit 140b configured to couple with the rack 120 so as to move the scanning unit 110a in the focus direction Y perpendicular to the scanning direction X.

The scanning unit 110a may include a scanning module 111 and a support frame 116 supporting the scanning module 111. The focus adjusting unit 140b may include a gear 143 arranged to couple with the rack 120 to move the scanning unit 110a in the focus direction Y.

The gear 143 may include a first teeth row 143a for engagement with the rack 120 and a second teeth row 143b formed to the inner surface of the gear 143.

The support frame 116 may include a unit teeth row 146 configured to engage with the second teeth row 143b. According to an embodiment, the support frame 116 may further include a boss 116a, the outer surface of which may have formed thereon the unit teeth row 146 for engagement with the second teeth row 143b of the gear.

The scanner 100b may further include a guiding frame 180. The guiding frame 180 may include an insertion hole 185 into which a guiding shaft 170 mat be received and a concave groove 183 formed to prevent the guiding frame 180 from interfering with the boss 116a during the movement of the support frame 116 along the focus direction Y. The guide frame 180 may also provide the support for the gear 143.

The scanning unit 110a may further include a regulating plate 118 for regulating the movement of the gear 143 in the focus direction Y. A first end part of the regulating plate 118 is coupled to the guiding frame 180 while the second end part thereof contacts an upper side of the gear 143 to regulate the position of the gear 143.

According to one or more aspects of the present disclosure, an image forming apparatus may include a scanner according to any of the embodiments described herein, including for example, scanners 100, 100a or 100b, and may include a printing unit (not shown) configured to print an image according to the image data obtained through the scanner.

Examples of the printing unit that may be employed in such image forming apparatus may include an inkjet type that forms an image on a printing medium by ejecting ink droplets through nozzles of an inkjet print-head; an electrophotographic type that forms a toner image on a printing medium through successive processes of charging a photosensitive member, exposing the charged photosensitive member to form an electrostatic image, developing the electrostatic image with toner into a visible toner image, transferring and fusing the visible toner image onto a printing medium; and a thermal transferring type that forms an image by using a thermal printing head (TPH) to sublime a dye of a printing medium. The above examples however are not exhaustive. The image forming apparatus may alternatively employ other known printing unit types.

As describe herein, a scanner and an image forming apparatus consistent with one or more aspects of the present disclosure may advantageously allow a scanner of relatively simple configuration that is capable of moving the scan sensor in the focus direction and/or a reduction in the manufacturing cost of a scanner by allowing the movement of the scan sensor along the focus direction to be driven with the existing driving force with which the scan sensor is driven to move in the scan direction.

While several embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A scanner having a main body, comprising:
   a scanning unit configured to receive an optical information from a document while moving across the document along a scanning direction;
   a rack disposed within the main body at a location along a path of movement of the scanning unit along the scanning direction; and
   a focus adjusting unit coupled to the scanning unit, the focus adjusting unit comprising a gear configured to rotate in engagement with the rack, to thereby cause a movement of the scanning unit along a focus direction perpendicular to the scanning direction.

2. The scanner, according to claim 1, wherein a rotational movement of the gear causes the movement of the scanning unit along the focus direction.

3. The scanner according to claim 1, wherein the focus adjusting unit comprises a unit teeth row disposed at the scanning unit and arranged to engage the gear.

4. The scanner according to claim 3, wherein the scanning unit comprises:
   a scanning module having an optical sensor configured to receive the optical information and to convert the received optical information into an electrical signal, and
   a support frame which supports the scanning module, the unit teeth row being formed on the support frame.

5. The scanner according to claim 4, wherein the support frame comprises a boss received into an opening formed on a central portion of the gear, the unit teeth row being formed on an outer periphery of the boss, and
   wherein the gear comprises a first teeth row formed on an outer surface of the gear and a second teeth row formed in the opening of the gear, the first teeth row being arranged to engage the rack, the second teeth row being arranged to engage the unit teeth row of the boss.

6. The scanner according to claim 4, further comprising:
   a guiding frame supporting thereon the support frame, the guiding frame having a stud rotatably supporting the gear, the guiding frame being configured to receive a driving force and to move in the scanning direction according to the received driving force.

7. The scanner according to claim 4, further comprising:
   an elastic member arranged to elastically bias the support frame in the focus direction.

8. The scanner according to claim 3, wherein the gear comprises:
   a first gear arranged to engage the rack, and
   a second gear arranged to rotate coaxially with the first gear and to engage the unit teeth row.

9. The scanner according to claim 1, wherein the focus adjusting unit is disposed at both ends of the scanning unit.

10. The scanner according to claim 1, further comprising:
    a platen defining a planar surface on which the document is to be positioned to be scanned; and
    an automatic document transport unit configured to receive one or more documents and to transport the received one or more documents to the platen,
    wherein the platen comprises an automatic scanning area and a manual scanning area, the scanning unit being positioned adjacent to the automatic scanning area when receiving the optical information from the document that was transported by the automatic document transport unit and being positioned adjacent to the manual scanning area when receiving the optical information from the document that was manually placed on the platen.

11. The scanner according to claim 10, wherein the rack is disposed adjacent to an intermediate area of the platen between the automatic scanning area and the manual scanning area.

12. The scanner according to claim 1, wherein the rack comprises a first rack and a second rack spaced apart from each other, each of the first and second racks being disposed along a portion of the path of movement of the scanning unit in which a portion the scanning unit is operable to receive the optical information from the document.

13. The scanner according to claim 12, wherein each of the first rack and the second rack is configured to cause the movement of the scanning unit along the focus direction when engaged with the focus adjusting unit.

14. The scanner according to claim 13, further comprising:
    a rack moving unit configured to move at least one of the first rack and the second rack selectively between an engaging position and a releasing position, the at least one of the first rack and the second rack being able to engage with the focus adjusting unit when the at least one of the first rack and the second rack is in the engaging position, the at least one of the first rack and the second rack being incapable of engaging with the focus adjusting unit when the at least one of the first rack and the second rack is in the releasing position.

15. The scanner according to claim 14, wherein the scanner is operable in a user selectable book scanning mode, and
    wherein the scanner further comprises a control unit configured to control the rack moving unit so that the first rack and the second rack are both in the engaging position in response to the book scanning mode being selected by the user.

16. An image forming apparatus, comprising:
    a scanner;
    and a printing unit configured to form a visible image on a printing medium based on an image data obtained through the scanner,
    wherein the scanner comprises:
        a scanner body;
        a scanning unit configured to receive an optical information from a document while moving across the document along a scanning direction;
        a rack disposed within the scanner body at a location along a path of movement of the scanning unit along the scanning direction; and
        a focus adjusting unit coupled to the scanning unit, the focus adjusting unit comprising a gear configured to rotate in engagement with the rack, to thereby cause a movement of the scanning unit along a focus direction perpendicular to the scanning direction.

17. A scanner for acquiring an image of a document, comprising:
    an image sensor configured to receive optical information from the document and to convert the received optical information into electrical signals;

an image sensor carrier supporting thereon the image sensor and being configured to move in a first direction and in a second direction opposite the first direction;

an interfering member comprising a rack gear disposed along a path of movement of the image sensor carrier along the first and second directions, and positioned to come into an interfering contact with a portion of the image sensor carrier in such a manner the interfering contact causes the image sensor carrier to move perpendicular to the first and second directions, the image sensor carrier moving in a third direction toward the document when the image sensor carrier comes into the interfering contact with the interfering member while moving in the first direction, the image sensor carrier moving in a fourth direction away from the document when the image sensor carrier comes into the interfering contact with the interfering member while moving in the second direction.

18. The scanner of claim 17, wherein the image sensor carrier comprises a rotational gear and a geared extension portion, the rotational gear being capable of engaging with the rack gear and having an opening through which the geared extension portion is received, the rotational gear having gear teeth formed in the opening for engagement with the geared extension portion such that a rotational movement of the rotational gear causes the geared extension portion to move linearly in the opening to thereby cause a linear movement of the image sensor carrier along the third and fourth directions.

19. The scanner of claim 17, wherein the scanner is operable in a scanning mode in which the image sensor carrier moves in the third direction and subsequently in the fourth direction during scanning of a single document.

20. The scanner of claim 17, further comprising:

a platen defining a substantially planar surface on which the document rests while being scanned, wherein the scanner is operable in at least a first scanning mode and a second scanning mode, the image sensor being space apart from the platen by a first distance when the scanner is operating in the first scanning mode, the image sensor being space apart from the platen by a second distance different from the first distance when the scanner is operating in the second scanning mode.

* * * * *

UNITED STATES PATENT AND TRADEMARK OFFICE
CERTIFICATE OF CORRECTION

| | | |
|---|---|---|
| PATENT NO. | : 8,493,638 B2 | Page 1 of 1 |
| APPLICATION NO. | : 12/684458 | |
| DATED | : July 23, 2013 | |
| INVENTOR(S) | : Dong-Gyoo Lee | |

It is certified that error appears in the above-identified patent and that said Letters Patent is hereby corrected as shown below:

On the title page, in Column 1, item 56 (Other Publications), Line 1, Delete "languag" and insert -- language --, therefor.

Signed and Sealed this
Eighteenth Day of February, 2014

Michelle K. Lee
*Deputy Director of the United States Patent and Trademark Office*